US011973339B2

(12) United States Patent
Wang et al.

(10) Patent No.: US 11,973,339 B2
(45) Date of Patent: Apr. 30, 2024

(54) MODULAR DC CIRCUIT BREAKER WITH INTEGRATED ENERGY STORAGE FOR FUTURE DC NETWORKS

(71) Applicant: Ohio State Innovation Foundation, Columbus, OH (US)

(72) Inventors: Jin Wang, Powell, OH (US); Risha Na, Columbus, OH (US); Yue Zhang, Upper Arlington, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 17/342,838

(22) Filed: Jun. 9, 2021

(65) Prior Publication Data

US 2022/0045506 A1 Feb. 10, 2022

Related U.S. Application Data

(60) Provisional application No. 63/063,661, filed on Aug. 10, 2020.

(51) Int. Cl.
*H02H 7/26* (2006.01)
*H01H 33/59* (2006.01)
*H02M 1/34* (2007.01)

(52) U.S. Cl.
CPC .......... *H02H 7/268* (2013.01); *H01H 33/596* (2013.01); *H02M 1/344* (2021.05)

(58) Field of Classification Search
CPC ............ H02H 7/00; H02H 7/26; H02H 7/268; H02H 3/00; H02H 3/08; H02H 3/087;

(Continued)

(56) References Cited

U.S. PATENT DOCUMENTS

| 9,966,874 B2 * | 5/2018 | Wang | H02M 7/483 |
| 2015/0029764 A1 * | 1/2015 | Peng | H02J 3/1814 |
| | | | 363/37 |
| 2016/0006236 A1 * | 1/2016 | Tang | H01H 33/596 |
| | | | 361/91.5 |

FOREIGN PATENT DOCUMENTS

CN 104900444 A * 9/2015

OTHER PUBLICATIONS

L. Tang et al., "Locating and Isolating DC Faults in Multi-Terminal DC Systems", IEEE Transactions on Power Delivery, vol. 22, No. 3, Jul. 2007. (Year: 2007).*

(Continued)

*Primary Examiner* — Thienvu V Tran
*Assistant Examiner* — Carlos O Rivera-Perez
(74) *Attorney, Agent, or Firm* — Meunier Carlin & Curfman LLC

(57) ABSTRACT

A T-breaker is an all-in-one solution for dc microgrid fault protection, power flow control, and power quality improvement. A T-breaker features a modular multilevel "T" structure with integrated energy storage devices. The two horizontal arms of the T-breaker realize fault current breaking, load voltage compensation, and power flow control; and the vertical arm of the T-breaker realizes shunt compensation. The configuration provides excellent voltage scalability and relaxes the requirements on the switching signal synchronization during fault transients. The local energy storage in sub-modules eases the fault energy dissipation requirement placed on the traditionally-adopted surge arrestors. The modular multilevel structure also offers immense control flexibility for all types of targeted functions of the provided T-breaker.

20 Claims, 17 Drawing Sheets

(58) Field of Classification Search
CPC .......... H02M 1/32; H02M 1/34; H02M 1/342;
H02M 1/344; H02M 1/346; H02M 1/348;
H02M 1/0009; H02M 1/0085; H02M
1/0095; H02M 7/162; H02M 7/219;
H02M 7/483; H02M 7/4835; H02M
7/487; H02M 7/521; H02M 7/5387;
H01H 33/00; H01H 33/59; H01H 33/596;
H02J 3/18; H02J 3/1807; H02J 3/1814;
H02J 3/1821; H02J 3/1835; H02J 3/1842;
H02J 3/1857; H02J 3/36
USPC .. 361/18, 78, 79, 86, 87, 88, 90, 91.1, 93.1,
361/100, 101, 102, 109, 111, 114, 115,
361/116; 363/50–58; 323/276, 277, 908
See application file for complete search history.

(56) References Cited

OTHER PUBLICATIONS

English translation of CN104900444. (Year: 2015).*
S. Ali, Z. Ling, K. Tian and Z. Huang, "Recent Advancements in Submodule Topologies and Applications of MMC," in IEEE Journal of Emerging and Selected Topics in Power Electronics, Apr. 27, 2020. doi: 10.1109/JESTPE.2020.2990689.
B. Patterson and C. H. DC, "DC, Come Home: DC microgrids and the birth of the 'enernet'," IEEE Power and Energy Magazine, vol. 10, No. 6, pp. 60-69, 2012. 10.1109/MPE.2012.2212610.
D. J. Becker and B. Sonnenberg, "DC microgrids in buildings and data centers," in 2011 IEEE 33rd International Telecommunications Energy Conference (INTELEC). IEEE, 2011, pp. 1-7.
M. Callavik, A. Blomberg, J. Hafner, and B. Jacobson, "The hybrid hvdc breaker," ABB Grid Systems Technical Paper, vol. 361, pp. 143-152, 2012.
R. Derakhshanfar, T. Jonsson, U. Steiger, and M. Habert, "Hybrid hvdc breaker-technology and applications in point-to-point connections and de grids," in CIGRE session, 2014, pp. 1-11.
N. G. Hingorani, L. Gyugyi et al., "Concepts and technology of flexible AC transmission systems," Understanding Facts, p. 210, 2000.
F. Z. Peng and J. Wang, "Flexible transmission and resilient distribution systems enabled by power electronics," Power Electronics in Renewable Energy Systems and Smart Grid: Technology and Applications, pp. 271-314, Jul. 1, 2019.
E. Youssef, A. Sharaf, A. Amin, and A. El Samhey, "Wind energy facts applications and stabilization schemes," in Advances in Renewable Energies and Power Technologies. Elsevier, Feb. 16, 2018, pp. 431-460.
F. Z. Peng, "Flexible ac transmission systems (facts) and resilient AC distribution systems (racds) in smart grid," Proceedings of the IEEE, vol. 105, No. 11, pp. 2099-2115, 2017.
K. A. Potty, E. Bauer, H. Li, and J. Wang, "Smart resistor: Stabilization of DC microgrids containing constant power loads using high-bandwidth power converters and energy storage," IEEE Transactions on Power Electronics, vol. 35, No. 1, pp. 957-967, Apr. 11, 2019.
B. Hu, Z. Wei, H. Li, D. Xing, M. J. Scott, R. Na, and J. Wang, "A self-sustained circuit building block based on 10-kv silicon carbide devices for high-voltage applications," IEEE Journal of Emerging and Selected Topics in Power Electronics, vol. 8, No. 3, pp. 2801-2811, May 27, 2019. 10.1109/JESTPE.2019.2918991.
A. Abramovitz and K. Ma Smedley, "Survey of solid-state fault current limiters," IEEE Transactions on Power Electronics, vol. 27, No. 6, pp. 2770-2782, 2012.
K. Tan, X. Song, C. Peng, P.Liu, and A. Q. Huang, "Hierarchical protection architecture for 380v DC data center application," in 2016 IEEE Energy Conversion Congress and Exposition (ECCE). IEEE, 2016, pp. 1-8.

* cited by examiner

Traditional SSCB 205

210 *Step 1:* Rearranging semiconductor switches
220 *Step 2:* Forming submodules by adding submodule capacitors

*Left arm* 222   *Right arm* 225

230 *Step 3:* Adding the vertical arm to enable ancillary functions

*Vertical arm* 240

650

700

800

900

1000

MODULAR DC CIRCUIT BREAKER WITH INTEGRATED ENERGY STORAGE FOR FUTURE DC NETWORKS

CROSS-REFERENCE TO RELATED APPLICATIONS

This application claims the benefit of U.S. provisional patent application No. 63/063,661, filed on Aug. 10, 2020, and entitled "MODULAR DC CIRCUIT BREAKER WITH INTEGRATED ENERGY STORAGE FOR FUTURE DC NETWORKS," the disclosure of which is expressly incorporated herein by reference in its entirety.

STATEMENT OF GOVERNMENT SUPPORT

This invention was made with government support under Award Number DE-AR0001110 awarded by the U.S. Department of Energy. The government has certain rights in the invention.

BACKGROUND

Direct current power distribution and dc microgrid have been gaining popularity among a wide range of applications such as aviation, ships, commercial buildings and data centers [1], [2].

While dc is an efficient way of power distribution that helps reducing power conversion stages, there are still technical challenges towards its wider adoption, they are: fast and smart fault protection, and power flow control, power quality improvement, and stability enhancement.

In conventional approaches, power flow control, power quality improvement, and stability enhancement are realized with source converters whereas protection are achieved by either mechanical or solid-state circuit breakers (SSCB).

Mechanical dc circuit breakers have the benefit of low on-state loss but suffers from short lifetime and slow speed. Their response time is in the range of the several milliseconds [3], which could be insufficient for low-inertia systems. SSCBs are seen as excellent candidates when fast protection is needed. Traditional SSCBs, such as the conventional solid-state circuit breaker (SSCB) 100 with insulated-gate bipolar transistors (IGBTs) 105 as shown in FIG. 1, are built with silicon devices and have issues such as high on-state loss, bulky metal oxide varistors (MOVs), and the needs for bidirectional blocking switches and near-perfect synchronization between switches during the fault transients. Hybrid dc circuit breakers were proposed to find the middle ground between on-state loss and protection speed [3], [4], but still requires bi-directional blocking switches and synchronization between switches.

For traditional ac transmission systems, in order to improve power transfer ability and system stability, there exists many flexible alternating current transmission system devices (FACTs) such as shunt-type static synchronous compensator (STATCOM). [5]-[8]. At the distribution level, static var generators (SVGS), D-STATCOMs, active power filters (APFs), dynamic voltage restorers (DVRs) and smart power converters for energy sources have also become popular for power flow control and power quality improvement.

However, there has been a lack of such devices developed to realize resilient and flexible direct current distribution while there is an obvious need for power and stability control and power quality improvement. A well-reported issue that the dc systems have is the network instability when the loads are often constant power loads (CPLs). The most common solution to stabilize a dc grid with CPLs is adding passive elements such as capacitors. However, the bulky capacitors could significantly reduce the power density in weight-size sensitive applications such as aviation. One of the proposed solutions to improve the system stability is to coordinate sources and loads with either source side or load side power converters. [9].

It is with respect to these and other considerations that the various aspects and embodiments of the present disclosure are presented.

SUMMARY

A T-type modular dc circuit breaker (T-breaker) system for dc networks is provided. A T-breaker has a modular structure, locally integrated energy storage, high tolerance to control signal mismatch during the fast network transients, and capability to assist power flow control, power quality improvement, and stability enhancement. The T-type breaker not only protects against faults, but also can function as an energy router with unparalleled ancillary functions for a dc grid.

In an implementation, a system comprises a first horizontal arm comprising a first half bridge structure and a first energy storage component in a first sub-module; a second horizontal arm comprising a second half bridge structure and a second energy storage component in a second sub-module, wherein terminals of each of the first sub-module and the second sub-module are connected to a distribution line; and a vertical arm connected to a middle point of the first horizontal arm and the second horizontal arm.

In an implementation, a modular circuit breaker comprises a first sub-module comprising a first bridge structure and a first energy storage component; a second sub-module comprising a second bridge structure and a second energy storage component; and a vertical arm.

In an implementation, a modular circuit breaker comprises a first horizontal arm comprising a first half bridge structure in a first sub-module; a second horizontal arm comprising a second half bridge structure in a second sub-module; and a vertical arm connected to a point on a distribution line of the first horizontal arm and the second horizontal arm, wherein the modular circuit breaker is configured to be operable in an active current limiting mode and in a compensation mode.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
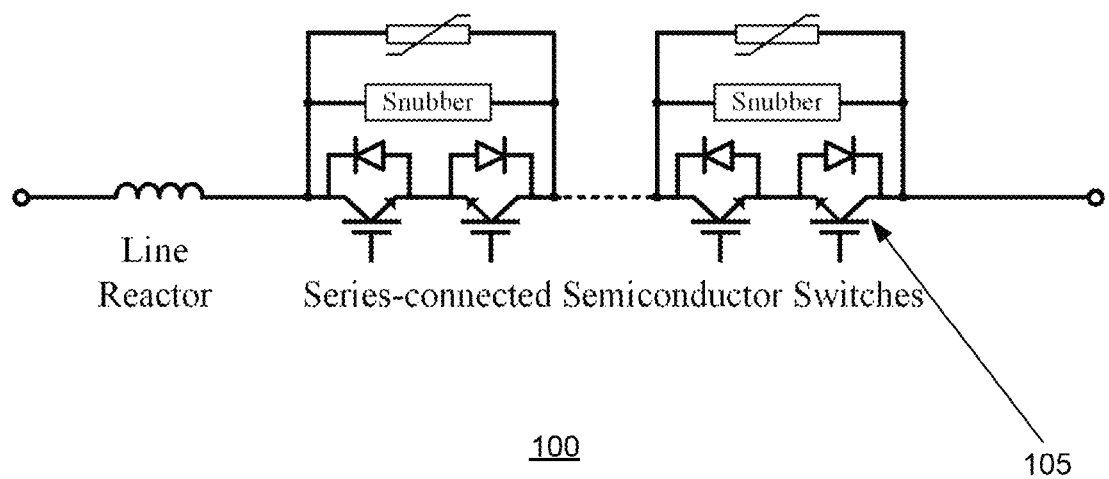
FIG. 1 is an illustration showing a conventional solid-state circuit breaker (SSCB) with insulated-gate bipolar transistor (IGBTs)

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

A T-breaker is described herein that is an all-in-one solution for dc microgrid fault protection, power flow control, and power quality improvement. The T-breaker described herein features a modular multilevel "T" structure with integrated energy storage devices. The two horizontal arms of the T-breaker can realize fault current breaking, load voltage compensation, and power flow control; and the vertical arm of the T-breaker can realize shunt compensation. Besides the all-in-one functions, the configuration herein provides excellent voltage scalability and relaxes the requirements on the switching signal synchronization during fault transients. The local energy storage in sub-modules eases the fault energy dissipation requirement placed on the traditionally-adopted surge arrestors. The modular multilevel structure also offers immense control flexibility for all types of targeted functions of the provided T-breaker.

T-breaker topology derivation and system definition are now described.

Figure 2:
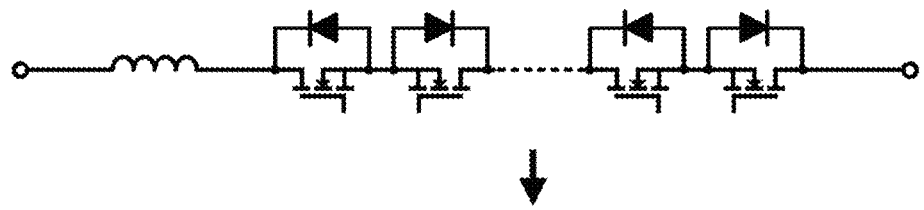
FIG. 2 is an illustration showing a derivation of an implementation of T-breaker topology.
Figure 2:
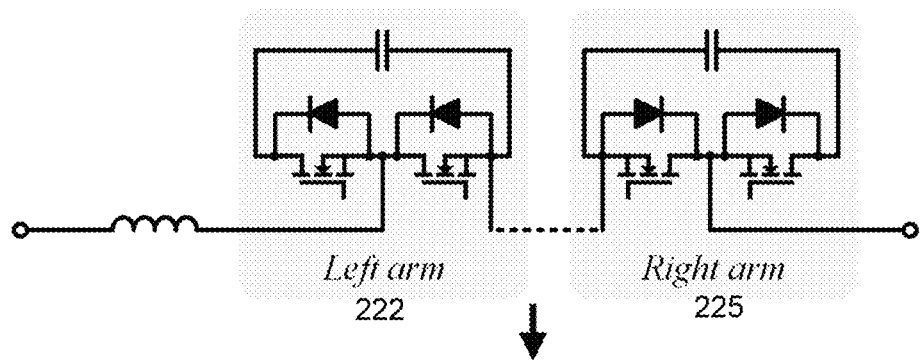
Figure 2:
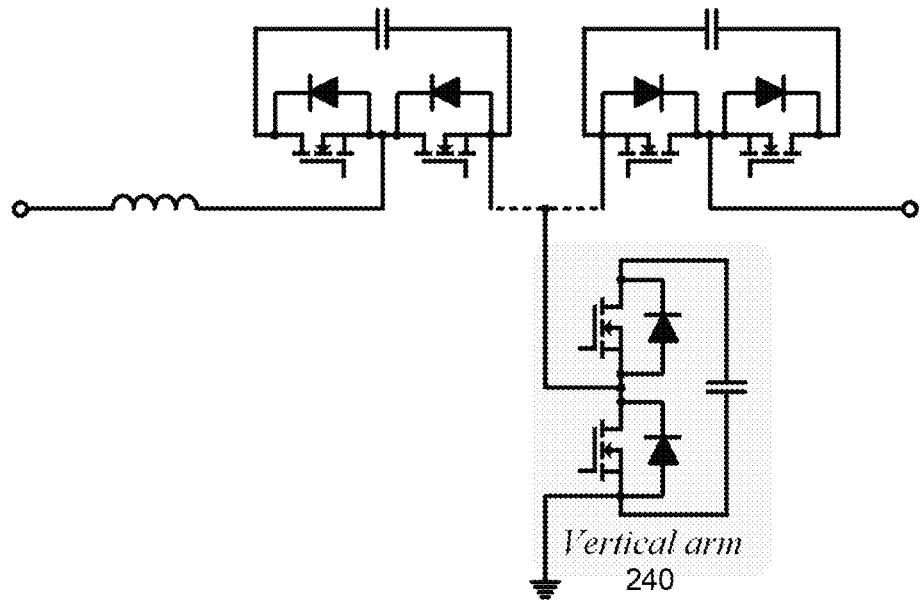

FIG. 2 is an illustration showing a derivation 200 of an implementation of T-breaker topology. As illustrated in FIG. 2, the T-breaker topology is derived from a traditional solid-state circuit breaker (SSCB) 205 through three major steps.

At a first step 210, semiconductor switches are rearranged. The semiconductor switches used in conventional SSCBs need to have bidirectional blocking capabilities. Commonly selected devices, such as insulated-gate bipolar transistor (IGBTs), metal-oxide-semiconductor field-effect transistors (MOSFETs) and integrated gate-commutated thyristors (IGCTs), are unidirectional blocking devices. Therefore, for conventional SSCBs, a pair of common-emitter/common-source connected devices is used together as an ac switch.

Step 220, as shown in FIG. 2, rearranges the anti-series connected ac switches into two separated groups, which not only does not increase the on-state loss, but also enables the possibility of using widely available half bridge power modules. The same power module configurations are also widely used for power converters in the same dc network. Thus, high modularity and interoperability can be achieved.

Thus at step 220, sub-modules are formed: a left arm 222 and a right arm 225. The half bridge structures could be configured into half bridge sub-modules by adding energy storage components such as capacitor banks, and connecting the two terminals of each sub-module to the distribution line. The choice of sub-module energy storage component can be expanded to batteries, super capacitors, etc.

The sub-module buses shall be kept at designed nominal voltages. By forming sub-modules, the breaker: (1) becomes self-sustainable by harvesting auxiliary power from sub-module capacitors for gate drives and control circuits; [10]; (2) becomes more reliable against gate signal mis-synchronization among semiconductor switches thanks to the sub-module capacitor's voltage clamping capability; (3) can absorb the fault current energy from line inductance during current breaking; and (4) could inject voltage to the line and realize power quality control.

Traditional SSCBs often implement snubber circuits that include a capacitor element. However, the snubber capacitors have much smaller sizes and are not meant for energy storage. In contrast, the capacitor implementation in a T-breaker is fundamentally different in that they are meant for both fault energy absorption during faults, and energy storage during normal operation. Therefore, they are sized larger than the typical snubber circuits, and they are maintained at desired working voltages throughout the system operation.

At a third step 230, a vertical arm 240 is added. This step 230 adds the vertical arm 240 to the middle point of the horizontal arms (i.e., the left arm 222 and the right arm 225). Similar to shunt-type FACTS devices [5]-[8], the added vertical arm 240 enables current injection and absorption to and from the power line. The vertical arm 240 can be controlled to improve power quality and expand the stability region of the grid.

The vertical arm 240 does not see the line current and is only used sporadically for short transients. Hence, the added vertical arm 240 will not have impact on the SSCB on-state loss, and the hardware can be sized smaller than those in the horizontal arms.

Figure 3:
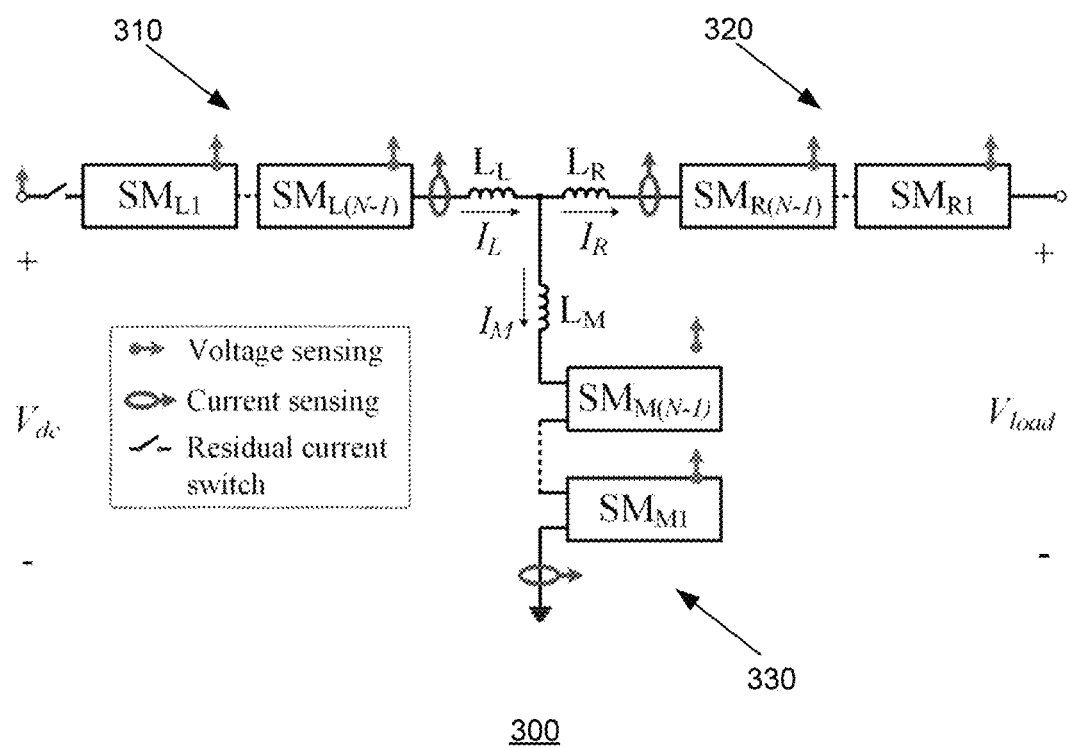
FIG. 3 is an illustration of an implementation of a generalized T-breaker.

A T-breaker is a fault protection device with modular multilevel converter functions. FIG. 3 is an illustration of an implementation of a generalized T-breaker 300.

There are three arms 310, 320, 330 in the T-breaker 300. The left arm 310 and the right arm 320 together are referred to as the horizontal arms. The arm inductances ($L_L$ and $L_R$) on these arms 310, 320, respectively, comprise the cable inductance and the line reactor inductance. The vertical arm 330 uses a discrete inductor (LM). The current on each arm ($I_L$, $I_R$, and $I_M$) should be fed back to the controller as well as the two bus terminal voltages ($V_{dc}$ and $V_{load}$). Similar to conventional SSCBs, a mechanical disconnecting switch is added to cut off the residual leakage current after current breaking events.

Sub-modules are the basic building blocks. Generally, all types of circuit topologies that are suitable for sub-modules in modular multilevel converters (MMC) can be implemented in a T-breaker, and there is a large variety of two-level and multi-level candidates to choose from [11]. Depending on the direction(s) of the sub-module voltage injection, the topologies can generally be grouped into unipolar and bipolar circuits.

Figure 4A:
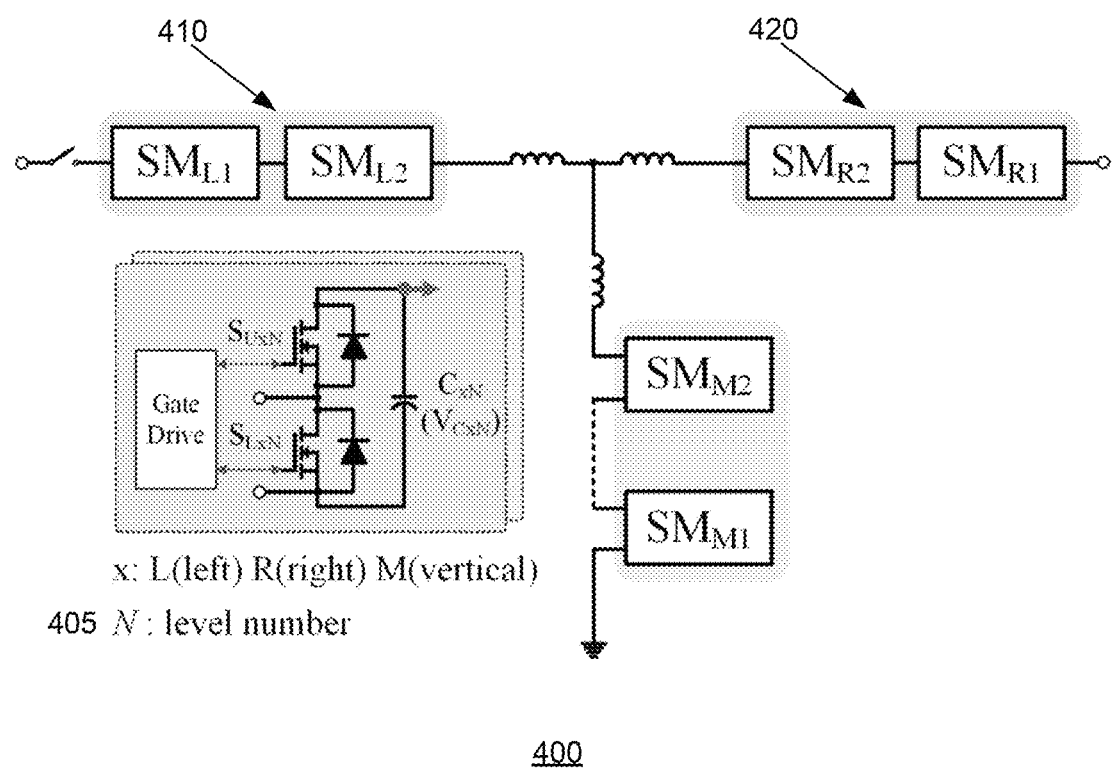
FIG. 4A shows a diagram of an implementation of a half bridge T-breaker.
Figure 4B:
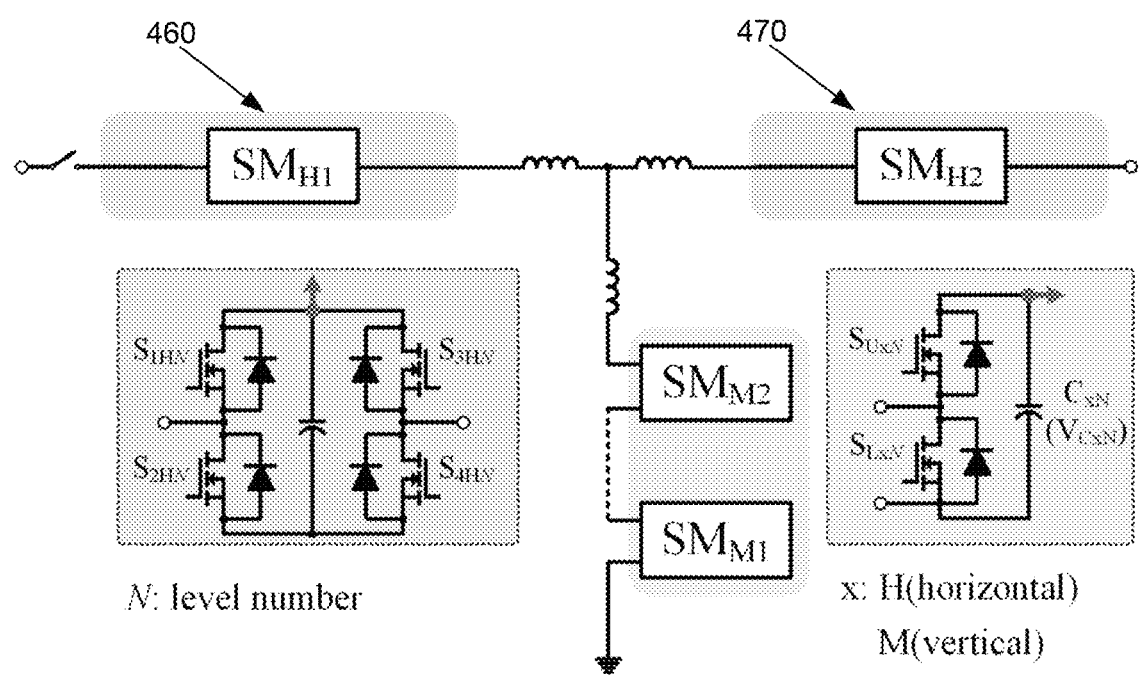
FIG. 4B shows a diagram of an implementation of a full bridge T-breaker.

FIG. 4A shows a diagram of an implementation of a half bridge T-breaker 400. FIG. 4B shows a diagram of an implementation of a full bridge T-breaker 450. The unipolar half bridge topology as shown in FIG. 4A, is described further herein. FIG. 4B shows the use of bipolar full bridge topology on the horizontal arms.

The number of levels (N) 405 of a T-breaker is defined by the number of voltage levels that can be injected into the power line within a single arm. For example, as shown in FIGS. 4A and 4B, for both three-level T-breaker topologies with the same number of power devices, the unipolar half bridge topology uses four sub-modules ($SM_{L1}$, $SM_{L2}$, $SM_{R1}$, $SM_{R2}$) on the horizontal arms 410, 420, whereas the bipolar full bridge topology uses two sub-modules ($SM_{H1}$, $SM_{H2}$) on the horizontal arms 460, 470.

The nominal voltage of each horizontal arm capacitor ($V_{sub,nom}$) should be actively maintained at $V_{dc}/(N-1)$. In order to maintain regulated current output capability from the vertical arm, depending on the breakdown voltage rating of the selected power devices, the voltage of each vertical arm sub-module should be maintained between $V_{dc}/(N-1)$ and the safe operation voltage of the device.

The sub-module capacitors can absorb the fault energy stored in the line inductance during network fault conditions. Voltage clamping devices, such as surge arrestors, could also be used in parallel with the capacitors to set an absolute maximum sub-module voltage and help dissipate more fault energy. Compared with traditional SSCBs, due to the increased equivalent "snubber capacitance", the surge arrestors see reduced heat dissipation and increased life cycle, the lifetime of the whole breaker could also be extended.

Operation modes and control strategies are now described.

Due to its multilevel converter structure, a T-breaker offers a lot of control flexibility for system protection and power control. Major operation modes cover three main aspects but are not limited to normal operation, fault operation, and compensation operation.

Normal operation has a start-up mode, a full-on mode, and a sub-module charging mode.

1) Start-up mode: All the sub-module capacitors need their voltages initialized to their nominal working levels during the system start-up. The T-breaker sub-module capacitors can be actively charged by controlling the sub-module switches' duty cycles before going to full-on conduction. The mechanical residual current switch can also be put in parallel with current limiting resistors to function as a pre-charge circuit to reduce the high in-rush currents during the start-up process.

2) Full-on mode: The full-on mode bypasses on the submodule capacitors on the horizontal arm to deliver the full current to the load.

3) Sub-module charging mode: Due to the loss of gate drive circuits and bleeding resistors that are in parallel with sub-module capacitors, the sub-module voltages can gradually decrease to zero if without active charging. Assuming the power consumption on each sub-module capacitor is $P_{sub}$, the allowed sub-module voltage ripple is $\Delta V_{Sub}$, and each sub-module capacitance is $C_{sub}$, the sub-module voltage needs recharging every $t_c$ second as defined in (1).

$$t_c = \frac{0.5 C_{sub} \Delta V_{sub}(2V_{sub,nom} - \Delta V_{sub})}{P_{sub}} \quad (1)$$

To maintain the required working nominal voltages, different control schemes are applied to horizontal and vertical arm sub-modules.

Figure 5:
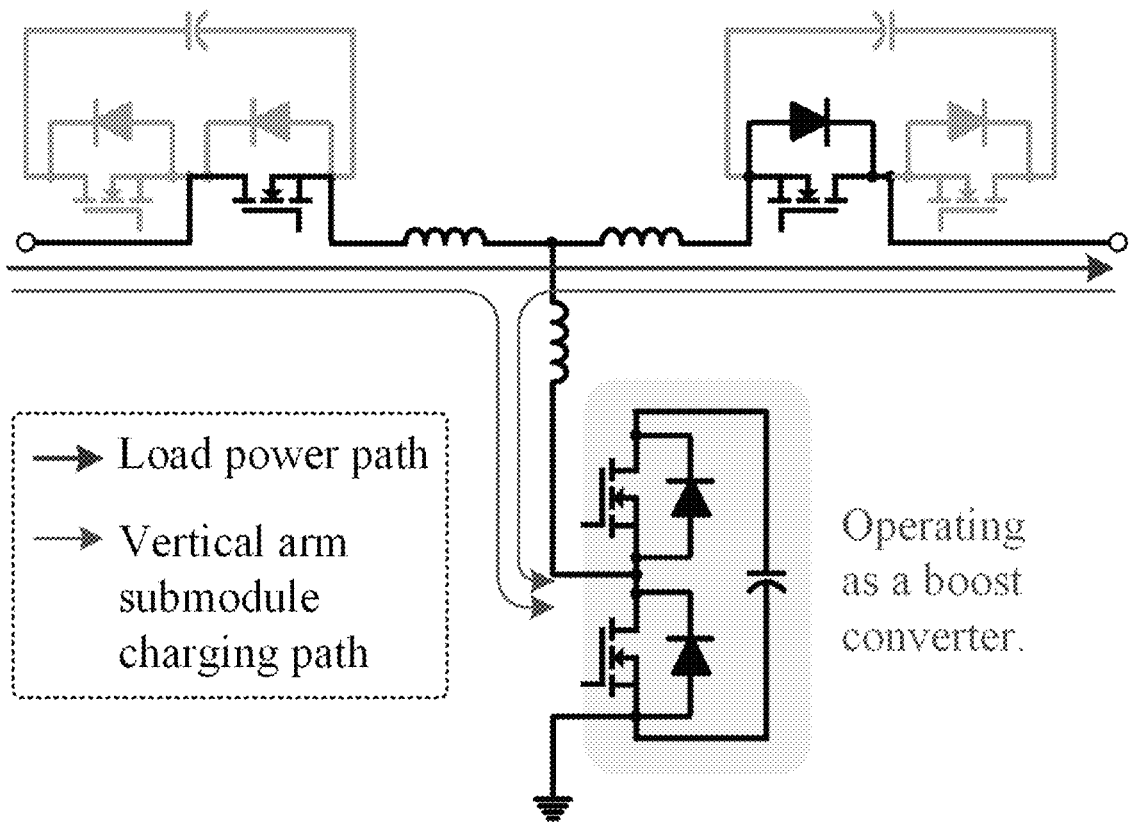
FIG. 5 is a diagram showing an implementation of a vertical arm sub-module voltage charging scheme.

The total voltage on the vertical arm should be maintained higher than the dc bus voltage. Therefore, during the full-on conduction mode, the vertical arm sub-modules can be operated together like a boost converter as illustrated in FIG. 5. FIG. 5 is a diagram showing an implementation of a vertical arm sub-module voltage charging scheme 500. By applying simple phase-shifted pulse-width modulation (PWM) control to the whole arm, the required middle arm inductance is reduced as the equivalent arm switching frequency increases.

The charging scheme for the horizontal arm depends on the sub-module topology.

Figure 6A:
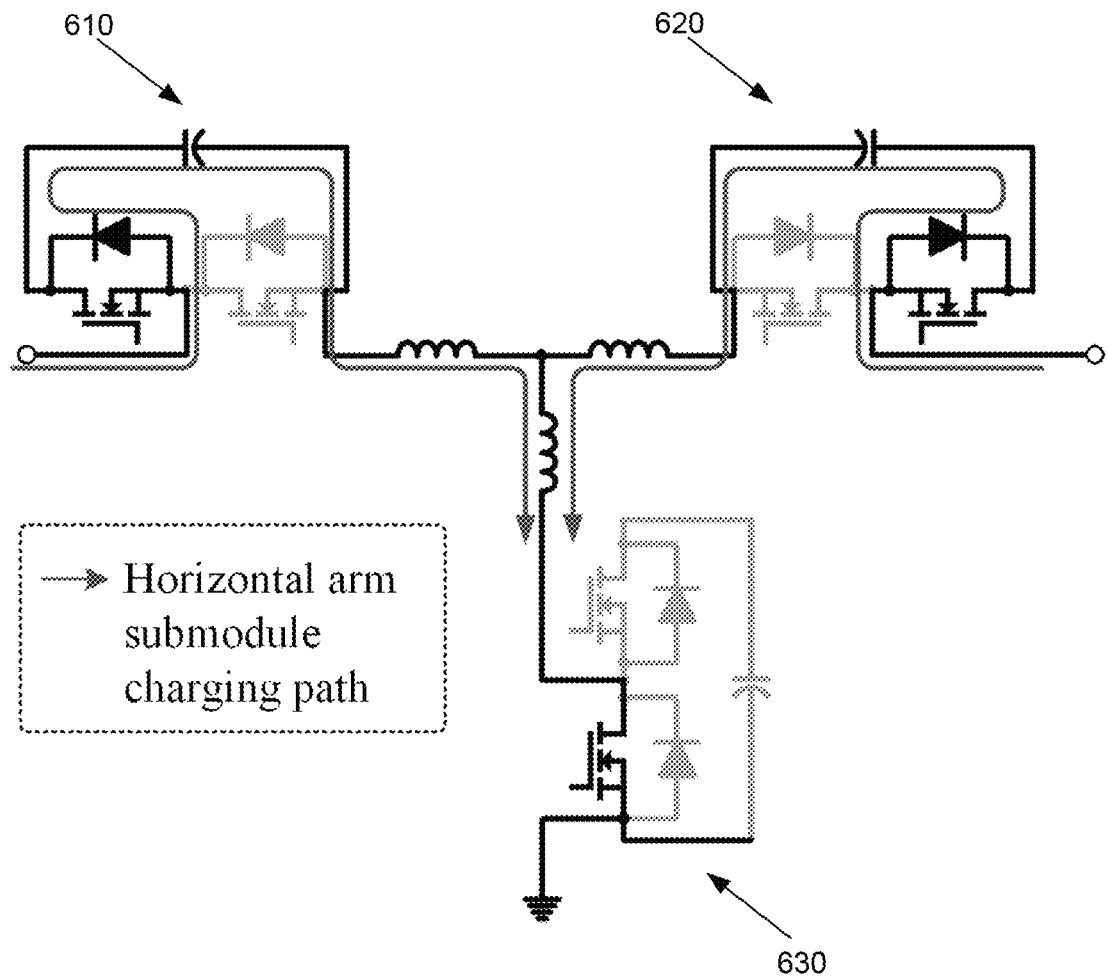
FIG. 6A shows an implementation of a horizontal arm sub-module voltage charging scheme using resonant charging with unipolar sub-modules.
Figure 6B:
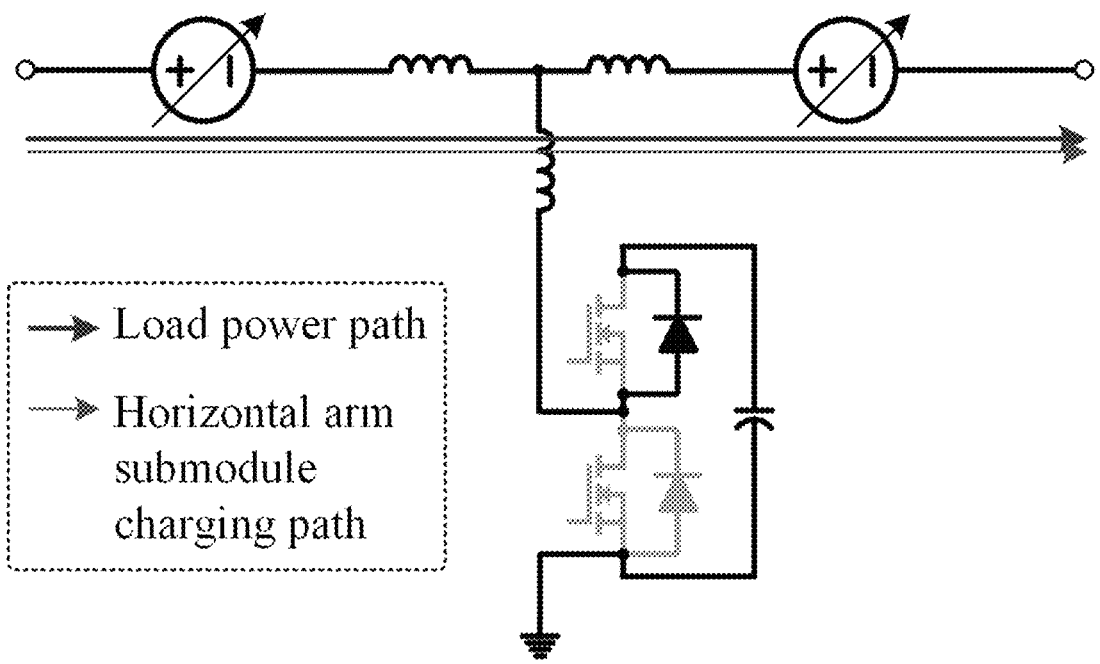
FIG. 6B shows an implementation of a horizontal arm sub-module voltage charging scheme using active pulse-width modulation (PWM) switching charging with bipolar sub-modules.

FIG. 6A shows an implementation of a horizontal arm sub-module voltage charging scheme 600 using resonant charging with unipolar sub-modules. FIG. 6B shows an implementation of a horizontal arm sub-module voltage charging scheme 650 using active PWM switching charging with bipolar sub-modules. For unipolar topologies, the resonant charging procedure is adopted. As presented in FIG. 6A, the vertical arm 630 is bypassed to the ground, while the horizontal arm sub-modules 610, 620 capacitors are inserted. The benefit of this strategy is its fast speed. However, the charging current is expected to have high amplitude and the power flow to the load is shortly interrupted.

For bipolar sub-modules, the passive charging is still available. Alternatively, active PWM control can be used to maintain the sub-module voltages, because all horizontal arm sub-modules can be inserted into the line in both directions, when a sub-module sees under-voltage or over-voltage, by applying PWM control and injecting a small voltage into the line ($V_{sub,inj}$), the amount and the direction of the power flow into each sub-module can be precisely controlled, and the sub-module voltages are therefore maintained.

Similarly, phase-shifted PWM control can be used to minimize the disturbance to the line current. The line current ripple introduced by the active PWM charging of a single sub-module when all sub-modules are operating is defined in (2). It is determined by the equivalent injected voltage from the sub-modules ($V_{sub,inj}$), the total line inductance ($L_L + L_R$), the switching cycle ($T_s$), and the number of levels (N−1).

$$\Delta i_{line} = \frac{V_{sub,inj}}{L_L + L_R} \frac{T_s}{2(N-1)} \qquad (2)$$

For both horizontal and vertical arms, the voltage sorting control in classic multilevel converters could also be implemented to assure voltage balance between all sub-modules.

Fault operation has an active current limiting mode and a breaking mode.

1) Active current limiting mode: Dc systems have lower line inductance because the connections between interfaces of converters and loads are typically shorter. This consequently leads to increased fault current ramp rate and higher fault current amplitude during short circuit and ground fault. Therefore, dc systems require faster protection speed, and fault current limiters (FCLs) [12] is a promising approach to mitigate the potential damage caused by the faults. The use cases of FCLs are not limited to fault conditioning, it could also smooth out the current profiles during system start-up, load start-up and load transients.

Figure 7:
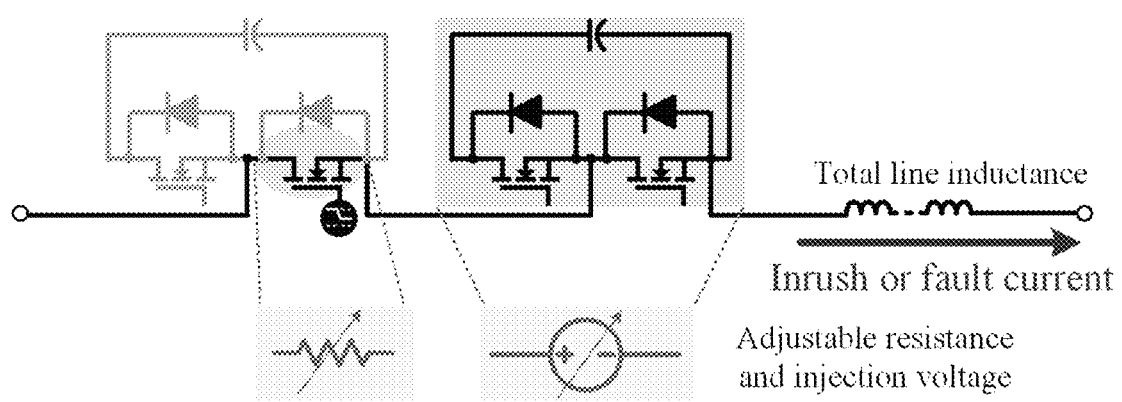
FIG. 7 shows an equivalent circuit of an implementation of T-breaker in active current limiting mode.

FIG. 7 shows an equivalent circuit of an implementation of a T-breaker 700 in active current limiting mode. The T-breaker 700 could actively limit the high currents by injecting a modulated sub-module voltage into the line, and equivalently increasing the distribution line resistance by driving the semiconductor devices in their saturation regions [13].

Figure 8:
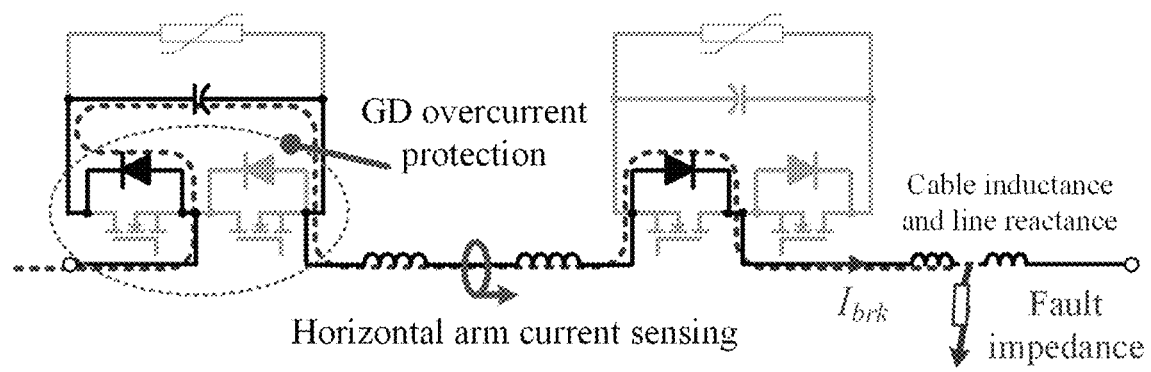
FIG. 8 is a diagram showing breaking current commutation of an implementation of a T-breaker.

2) Breaking mode: The line current is monitored by current sensing and the overcurrent protection circuit built into the gate driver. A fault condition is determined by both the amplitude of the line current and the duration of the fault current development. A T-breaker breaking mode is triggered by turning off all the switches. FIG. 8 is a diagram showing breaking current commutation of an implementation of a T-breaker 800. As a result, shown in FIG. 8, the line current would shift from the bypassing switch of each sub-module to the anti-parallel diode of the inserting switch. The sub-module capacitors (along with surge arrestors if implemented) absorb the fault energy, and their voltages are therefore charged up.

Figure 9:
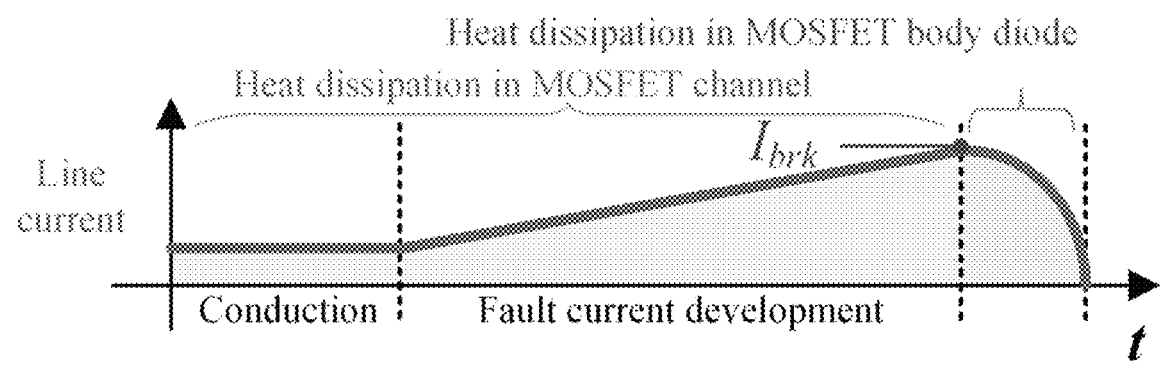
FIG. 9 is an illustration showing fault current development, breaking process, and heat dissipation on example semiconductor devices.

FIG. 9 is an illustration 900 showing fault current development, breaking process, and heat dissipation on example semiconductor devices. The breaking current follows the profile as illustrated in FIG. 9. It is seen that when a breaking action is initiated at $I_{brk}$, considering the fault current loop impedance ($R_{flt}$ and $L_{flt}$), and the number of levels (N), if the all the sub-module capacitors absorb the full fault energy, the breaking current profile follows (3), and each sub-module would see a voltage rise as defined in (4).

$$I_{line}(t) = I_{brk} e^{-\frac{R_{flt}t}{2L_{flt}}} \left( \frac{e^{\sigma_1} + e^{-\sigma_1}}{2} - \frac{\sqrt{C_{sub}} R_{flt} \left( \frac{e^{\sigma_1} - e^{-\sigma_1}}{2} \right)}{\sqrt{C_{sub} R_{flt}^2 - 4L_{flt}(N-1)}} \right) \qquad (3)$$

$$\Delta V_{sub}(t) = \frac{I_{brk} L_{flt} e^{-\frac{R_{flt}t}{2L_{flt}}} (e^{\sigma_1} - e^{-\sigma_1})}{\sqrt{C_{sub}} \sqrt{C_{sub} R_{flt}^2 - 4L_{flt}(N-1)}} \text{ where} \qquad (4)$$

$$\sigma_1 = \frac{t\sqrt{C_{sub} R_{flt}^2 - 4L_{flt}(N-1)}}{2\sqrt{C_{sub}} L_{flt}}.$$

After the breaking action, the horizontal arm sub-modules could inject ac voltage disturbance to the fault current loop to characterize its impedance, and the fault locationing is therefore realized.

Figure 10:
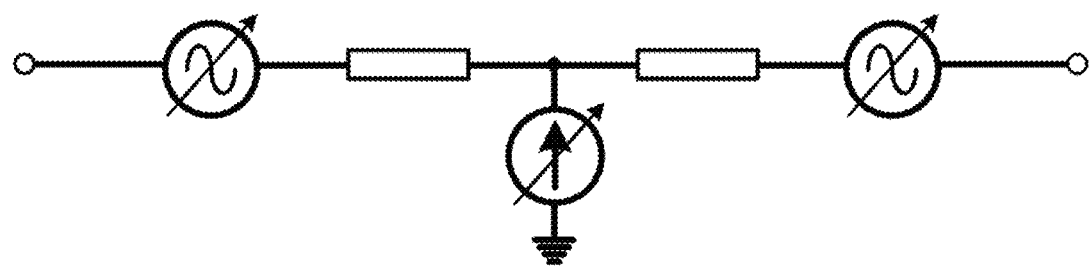
FIG. 10 shows an equivalent circuit of an implementation of a T-breaker compensation mode.

With respect to compensation operation, a T-breaker could offer functionalities equivalent to the series and shunt compensation offered by flexible alternating current transmission system (FACTS) devices in ac transmission systems. FIG. 10 shows an equivalent circuit 1000 of an implementation of a T-breaker compensation mode. As shown in the equivalent circuit 1000 in FIG. 10, voltage and current can be injected into the power line to realize power flow and quality control.

A case study is described to analyze the half-bridge T-breaker operation under various breaker and system operating conditions. The studied system is rated at 1 kV, 500 A, and the loads are constant power loads (CPLs). The vertical arm submodules are integrated with battery cells. The system and breaker specifications are given in Table I.

TABLE 1

SYSTEM AND T-BREAKER SPECIFICATIONS

| Parameter | Variable | Value |
| --- | --- | --- |
| Dc bus voltage | $V_{dc}$ | 1 kV |
| Nominal dc current | $I_{nom}$ | 500 A |
| Number of levels | N | 2 |
| Maximum breaking current | $I_{brk}$ | 5 kA |
| Horizontal arm SM capacitance | $C_{sub}$ | 130 μF |
| Horizontal arm SM nominal voltage | $V_{sub}$ | 500 V |
| Maximum horizontal arm SM voltage | $V_{sub,max}$ | 900 V |
| Vertical arm SM battery voltage | $V_{subM}$ | 650 V |

The system normal operation includes system start-up, full-on conduction, and sub-module charging mode.

Figure 11:
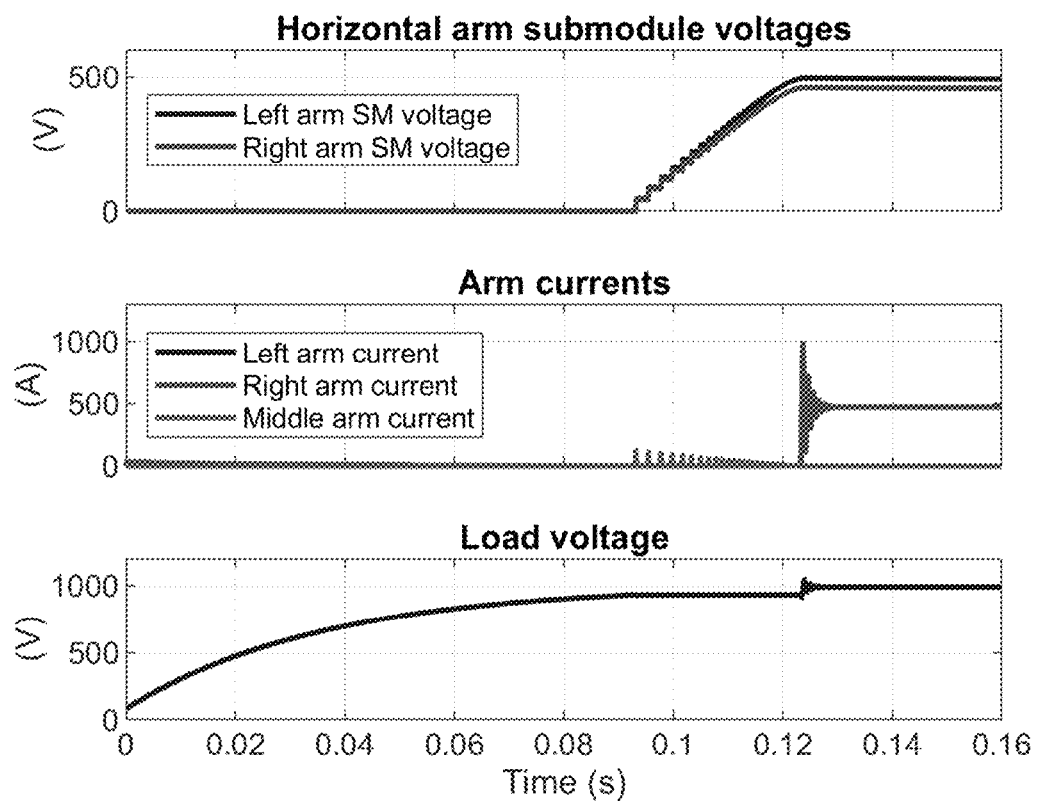
FIG. 11 shows diagrams of example system start-up (load and horizontal arm sub-module voltage initialization)

FIG. 11 shows diagrams 1100 of example system start-up (load and horizontal arm sub-module voltage initialization). More particularly, FIG. 11 shows the simulated waveform of the system start-up procedure. The two horizontal arm sub-modules are charged with short pulses until they reach their desired working voltages.

Figure 12:
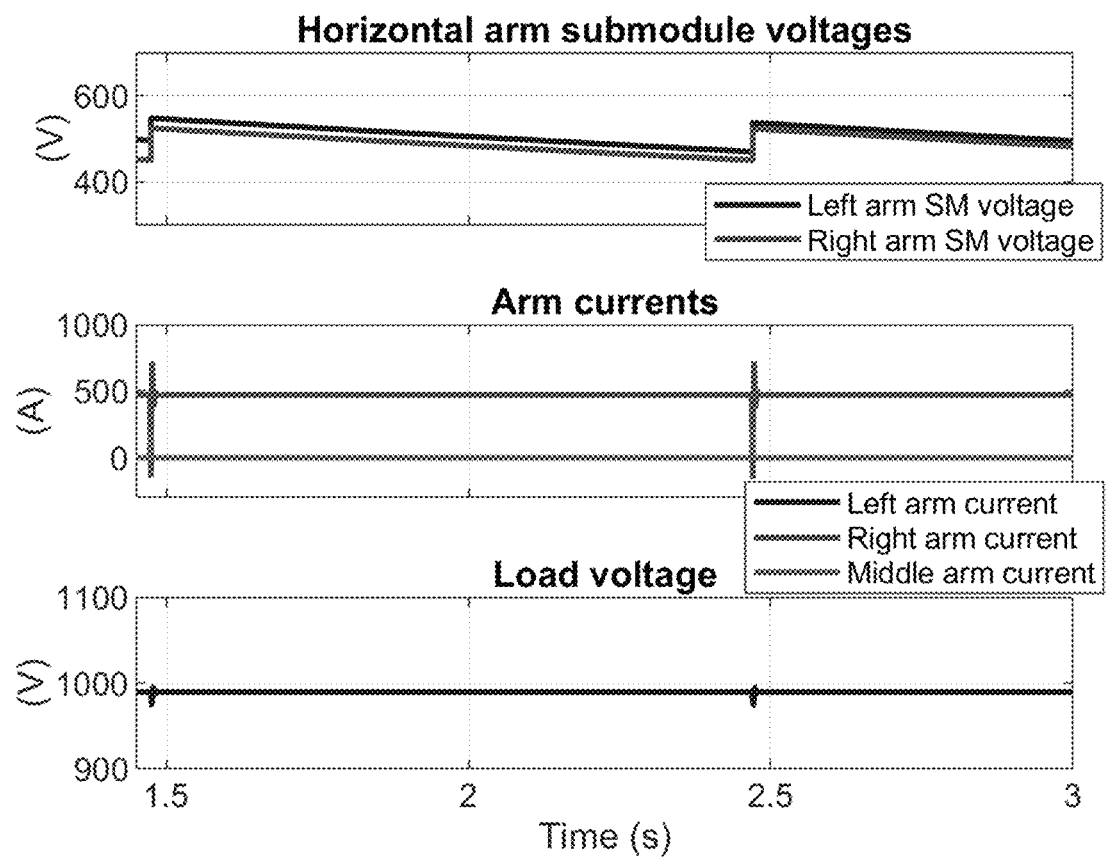
FIG. 12 shows diagrams of example horizontal arm sub-module charging (passive process)

After the T-breaker is fully on and the power delivery to the load starts, the sub-module voltages are maintained through the resonant charging process as introduced in FIG. 6A. For the system under study, FIG. 12 shows the simulated horizontal arm sub-module charging process. FIG. 12 shows diagrams 1200 of example horizontal arm sub-module charging (passive process). It is seen that the charging process is initiated when the sub-module voltages reach 450 V, the resonant charging process quickly restores the voltages back to 500 V while introducing a short disturbance to the line currents and the load voltage bus.

Figure 13:
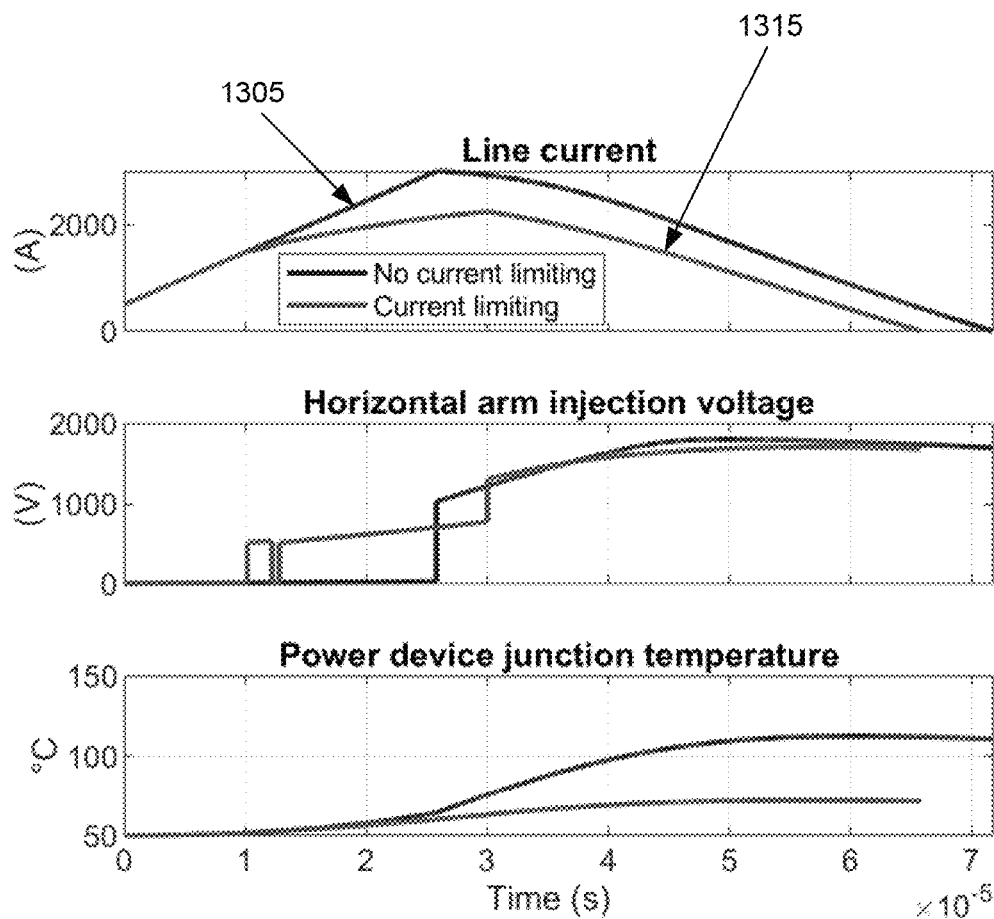
FIG. 13 shows diagrams of example fault current handling: 3-kA breaking vs. active current limiting before breaking.

The fault current is handled with two different control strategies in the studied system. FIG. 13 shows diagrams 1300 of example fault current handling: 3-kA breaking vs. active current limiting before breaking. As shown in FIG. 13, the line 1305 shows a fast fault current rise to 3 kA before the breaking process starts and quickly cuts the fault current.

In the case represented by the line 1315, active current limiting through sub-module voltage injection is initiated when the line current reaches 1500 A. A duty ratio of 0.5 is applied to the horizontal arm sub-modules and the current ramp rate significantly slows down. A fault is confirmed after 20 μs of continuous current rise and a breaking action is initiated at 30 μs. This fault handling strategy is summarized as limit, confirm, and break.

FIG. 13 also shows the sub-module voltage rise and the maximum junction temperature of the semiconductor devices. For the current limited fault, the final horizontal arm submodule reaches similar voltages; however, the maximum junction temperature sees a significant decrease due to lowered fault current amplitude, reduced total fault duration, and more evenly distributed heat through device channels and their free-wheeling diodes.

A T-breaker is capable of improving the system's stability when CPLs are introduced. Under the same system studied, a source voltage sag of 10% is introduced. Mathematical representation using Lyapunov function was derived to analyze the large signal stability. Region of Attraction (ROA) is a tool used to show whether the system can go back to its equilibrium (stable) or not (unstable) and the limit of its stability.

Figure 14A:
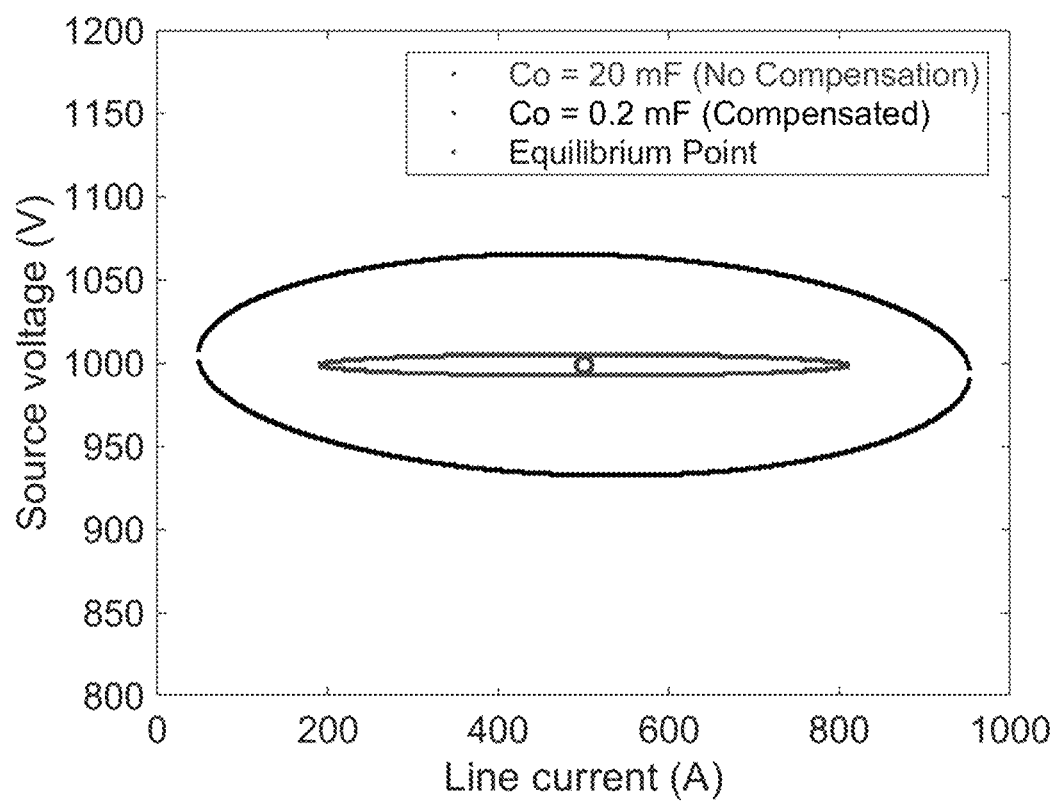
FIG. 14A illustrates stability improvement with an implementation of a T-breaker in shunt compensation mode showing region of attraction comparison.
Figure 14B:
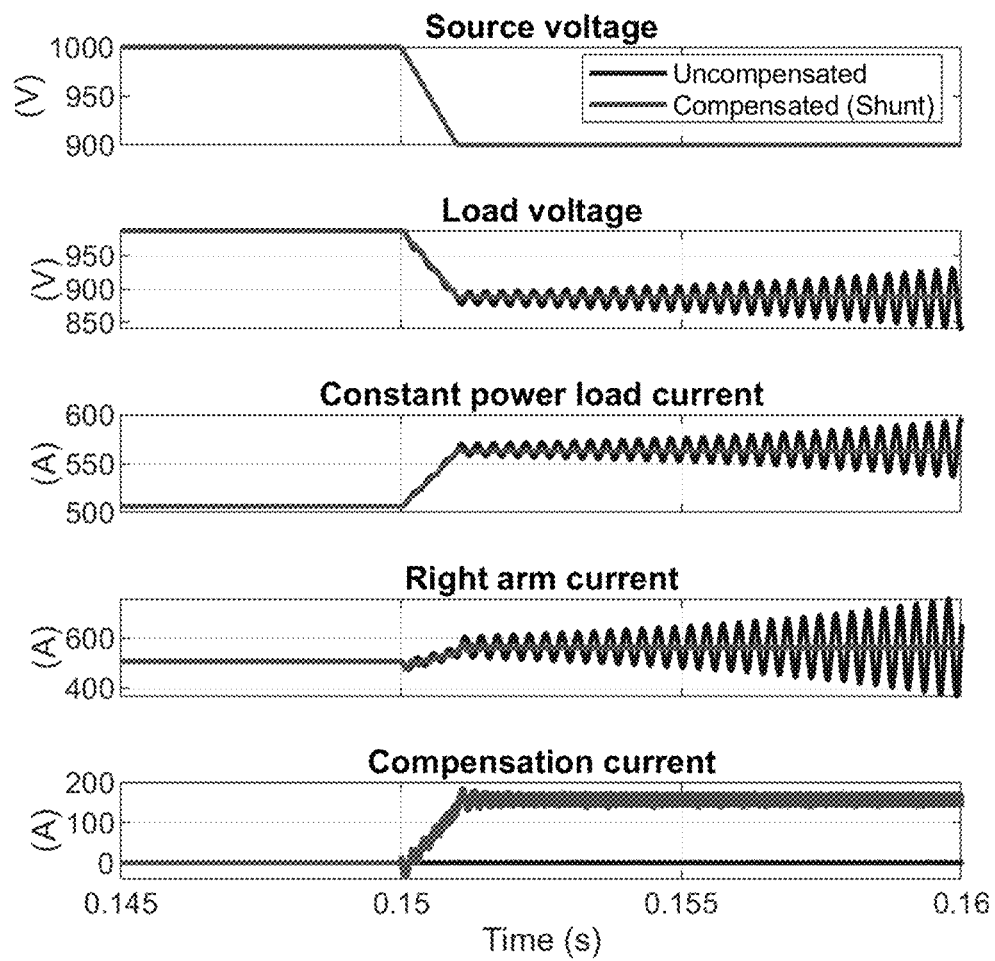
FIG. 14B illustrates stability improvement with an implementation of a T-breaker in shunt compensation mode showing time domain simulation.

FIG. 14A illustrates stability improvement with an implementation of a T-breaker in shunt compensation mode showing region of attraction comparison 1400, and FIG. 14B illustrates stability improvement with an implementation of a T-breaker in shunt compensation mode showing time domain simulation 1450.

More particularly, FIG. 14A shows two cases of having load dc link capacitance as 20 mF with no compensation against much smaller load dc link capacitance of only 0.2 mF while the shunt compensation is enabled. Compensation helps stabilize the system under disturbances with much smaller bus capacitance. As a result, a T-breaker's compensation can help reduce system size while achieving better stability. This stability analysis is verified using the circuit model in Simulink. FIG. 14B shows the time domain system response for a 10% voltage sag incident. Under the 0.2-mF load dc link capacitance alone, the system becomes unstable, while the compensation stabilizes the system under the same disturbance.

A T-breaker has the benefits of locally integrated energy storage, excellent voltage scalability, high tolerance to control signal mismatch and unparalleled ancillary functions, which make it a promising candidate as the all-in-one energy router for future dc networks.

REFERENCES

[1] B. Patterson and C. H. DC, "DC Microgrids and the Birth of the 'Enernet'," IEEE Power and Energy Magazine, vol. 10, no. 6, pp. 60-69, 2012.
[2] D. J. Becker and B. Sonnenberg, "Dc microgrids in buildings and data centers," in 2011 IEEE 33rd International Telecommunications Energy Conference (INTELEC). IEEE, 2011, pp. 1-7.
[3] M. Callavik, A. Blomberg, J. Hafner, and B. Jacobson, "The hybrid HVDC breaker," ABB Grid Systems Technical Paper, vol. 361, pp. 143-152, 2012.
[4] R. Derakhshanfar, T. Jonsson, U. Steiger, and M. Habert, "Hybrid HVDC breaker—technology and applications in point-to-point connections and DC grids," in CIGRE session, 2014, pp. 1-11.
[5] N. G. Hingorani, L. Gyugyi et al., "Concepts and technology of flexible ac transmission systems," Understanding FACTS, p. 210, 2000.
[6] F. Z. Peng and J. Wang, "Flexible transmission and resilient distribution systems enabled by power electronics," Power Electronics in Renewable Energy Systems and Smart Grid: Technology and Applications, pp. 271-314, 2019.
[7] E. Youssef, A. Sharaf, A. Amin, and A. El Samhey, "Wind energy facts applications and stabilization schemes," in Advances in Renewable Energies and Power Technologies. Elsevier, 2018, pp. 431-460.
[8] F. Z. Peng, "Flexible ac transmission systems (facts) and resilient ac distribution systems (racds) in smart grid," Proceedings of the IEEE, vol. 105, no. 11, pp. 2099-2115, 2017.
[9] K. A. Potty, E. Bauer, H. Li, and J. Wang, "Smart resistor: Stabilization of dc microgrids containing constant power loads using high-bandwidth power converters and energy storage," IEEE Transactions on Power Electronics, vol. 35, no. 1, pp. 957-967, 2019.
[10] B. Hu, Z. Wei, H. Li, D. Xing, M. J. Scott, R. Na, and J. Wang, "A self-sustained circuit building block based on 10-kv silicon carbide devices for high-voltage applications," IEEE Journal of Emerging and Selected Topics in Power Electronics, vol. 8, no. 3, pp. 2801-2811, 2019.
[11] S. Ali, Z. Ling, K. Tian, and Z. Huang, "Recent advancements in submodule topologies and applications of mmc," IEEE Journal of Emerging and Selected Topics in Power Electronics, 2020.
[12] A. Abramovitz and K. Ma Smedley, "Survey of solid-state fault current limiters," IEEE Transactions on Power Electronics, vol. 27, no. 6, pp. 2770-2782, 2012.
[13] K. Tan, X. Song, C. Peng, P. Liu, and A. Q. Huang, "Hierarchical protection architecture for 380 v dc data center application," in 2016 IEEE Energy Conversion Congress and Exposition (ECCE). IEEE, 2016, pp. 1-8.

In an implementation, a system comprises a first horizontal arm comprising a first half bridge structure and a first energy storage component in a first sub-module; a second horizontal arm comprising a second half bridge structure and a second energy storage component in a second sub-module, wherein terminals of each of the first sub-module and the second sub-module are connected to a distribution line; and a vertical arm connected to a middle point of the first horizontal arm and the second horizontal arm.

Implementations may include some or all of the following features. A respective arm inductance on the first horizontal arm and the second horizontal arm respectively comprise a cable inductance and a line reactor inductance. The vertical arm uses a discrete inductor. A current on each of the first horizontal arm, the second horizontal arm, and the vertical arm is fed back to a controller two bus terminal voltages. The system further comprises a mechanical disconnecting switch to cut off a residual leakage current after current breaking events. The first horizontal arm, the second horizontal arm, and the vertical arm are comprised in a modular structure. The first horizontal arm, the second horizontal arm, and the vertical arm are configured for locally integrated energy storage, a tolerance to control signal mismatch during network transients, and a capability to assist power flow control, power quality improvement, and stability enhancement. The first horizontal arm and the second horizontal arm realize fault current breaking, load voltage compensation, and power flow control, and wherein the vertical arm realizes shunt compensation. The first horizontal arm, the second horizontal arm, and the vertical arm are configured to protects against faults and function as an energy router.

In an implementation, a modular circuit breaker comprises a first sub-module comprising a first bridge structure and a first energy storage component; a second sub-module comprising a second bridge structure and a second energy storage component; and a vertical arm.

Implementations may include some or all of the following features. The first sub-module, the second sub-module, and the vertical arm are configured as a half bridge T-breaker. The first sub-module, the second sub-module, and the vertical arm are configured as a full bridge T-breaker. The first sub-module and the second sub-module comprise unipolar circuits. The first sub-module and the second sub-module comprise bipolar circuits. The module circuit breaker comprises a two-level circuit topology. The module circuit breaker comprises a multi-level circuit topology.

In an implementation, a modular circuit breaker comprises a first horizontal arm comprising a first half bridge structure in a first sub-module; a second horizontal arm comprising a second half bridge structure in a second sub-module; and a vertical arm connected to a point on a distribution line of the first horizontal arm and the second horizontal arm, wherein the modular circuit breaker is configured to be operable in an active current limiting mode and in a compensation mode.

Implementations may include some or all of the following features. When in the active current mode, the module circuit breaker actively limits high currents by injecting a modulated sub-module voltage into the distribution line, and equivalently increasing the distribution line resistance by driving semiconductor devices of the arms in their saturation regions. When in the compensation mode, the module circuit breaker injects voltage and current into the distribution line to realize power flow and quality control. The first sub-module, the second sub-module, and the vertical arm are configured as a half bridge T-breaker or as a full bridge T-breaker.

As used herein, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A T-type direct current (DC) circuit breaker comprising:
   a first horizontal arm comprising a first half bridge structure and a first energy storage component in a first sub-module, wherein the first energy storage component comprises at least one of a plurality of capacitors, one or more battery cells, or a super capacitor;
   a second horizontal arm comprising a second half bridge structure and a second energy storage component in a second sub-module, wherein terminals of each of the first sub-module and the second sub-module are connected to a distribution line, wherein the second energy storage component comprises at least one of a plurality of capacitors, one or more battery cells, or a super capacitor; and
   a vertical arm directly connected to a single middle point of the distribution line between the first horizontal arm and the second horizontal arm,
      wherein the T-type DC circuit breaker is configured to inject DC voltage into the distribution line to increase distribution line resistance in an active current limiting mode,
      wherein the T-type DC circuit breaker is configured to inject DC voltage and a direct current into the distribution line to realize power flow and quality control in a compensation mode, and
      wherein the first energy storage component and the second energy storage component are each configured for energy absorption during faults and energy storage during normal operation.

2. The T-type DC circuit breaker of claim 1, wherein a respective arm inductance on the first horizontal arm and the second horizontal arm respectively comprises a cable inductance and a line reactor inductance.

3. The T-type DC circuit breaker of claim 2, wherein the vertical arm uses a discrete inductor.

4. The T-type DC circuit breaker of claim 3, wherein a current on each of the first horizontal arm, the second horizontal arm, and the vertical arm is fed back to a controller as well as two bus terminal voltages.

5. The T-type DC circuit breaker of claim 4, further comprising a mechanical disconnecting switch to cut off a residual leakage current after current breaking events.

6. The T-type DC circuit breaker of claim 1, wherein the first horizontal arm, the second horizontal arm, and the vertical arm are comprised in a modular structure.

7. The T-type DC circuit breaker of claim 1, wherein the first horizontal arm, the second horizontal arm, and the vertical arm are configured for locally integrated energy storage, a tolerance to control signal mismatch during network transients, and a capability to assist power flow control, power quality improvement, and stability enhancement.

8. The T-type DC circuit breaker of claim 1, wherein the first horizontal arm and the second horizontal arm realize fault current breaking, load voltage compensation, and power flow control, and wherein the vertical arm realizes shunt compensation.

9. The T-type DC circuit breaker of claim 1, wherein the first horizontal arm, the second horizontal arm, and the vertical arm are configured to protect against faults and function as an energy router.

10. The T-type DC circuit breaker of claim 1, wherein the T-type DC circuit breaker is configured to inject an AC voltage disturbance to a fault current loop to characterize its impedance after a breaking event.

11. A modular T-type DC circuit breaker comprising:
a first horizontal sub-module comprising a first bridge structure and a first energy storage component, wherein the first energy storage component comprises at least one of a plurality of capacitors, one or more battery cells, or a super capacitor;
a second horizontal sub-module comprising a second bridge structure and a second energy storage component, wherein the second energy storage component comprises at least one of a plurality of capacitors, one or more battery cells, or a super capacitor; and
a vertical arm directly connected to a single middle point of a distribution line between the first horizontal sub-module and the second horizontal sub-module,
wherein the T-type DC circuit breaker is configured to inject DC voltage into the distribution line to increase distribution line resistance in an active current limiting mode,
wherein the T-type DC circuit breaker is configured to inject DC voltage and a direct current into the distribution line to realize power flow and quality control in a compensation mode, and
wherein the first energy storage component and the second energy storage component are each configured for energy absorption during faults and energy storage during normal operation.

12. The modular T-type DC circuit breaker of claim 11, wherein the first horizontal sub-module, the second horizontal sub-module, and the vertical arm are configured as a half bridge T-breaker.

13. The modular T-type DC circuit breaker of claim 11, wherein the first horizontal sub-module, the second horizontal sub-module, and the vertical arm are configured as a full bridge T-breaker.

14. The modular T-type DC circuit breaker of claim 11, wherein the first horizontal sub-module and the second horizontal sub-module comprise unipolar circuits.

15. The modular T-type DC circuit breaker of claim 11, wherein the first horizontal sub-module and the second horizontal sub-module comprise bipolar circuits.

16. The modular T-type DC circuit breaker of claim 11, comprising a two-level circuit topology.

17. The modular T-type DC circuit breaker of claim 11, comprising a multi-level circuit topology.

18. A modular T-type DC circuit breaker comprising:
a first horizontal arm comprising a first half bridge structure in a first sub-module, the first sub-module comprising a first energy storage component, wherein the first energy storage component comprises at least one of a plurality of capacitors, one or more battery cells, or a super capacitor;
a second horizontal arm comprising a second half bridge structure in a second sub-module, the second sub-module comprising a second energy storage component, wherein the second energy storage component comprises at least one of a plurality of capacitors, one or more battery cells, or a super capacitor; and
a vertical arm directly connected to a single point on a distribution line between of the first horizontal arm and the second horizontal arm,
wherein the modular T-type DC circuit breaker is configured to inject DC voltage into the distribution line to increase distribution line resistance in an active current limiting mode,
wherein the modular T-type DC circuit breaker is configured to inject DC voltage and a direct current into the distribution line to realize power flow and quality control in a compensation mode, and
wherein the first energy storage component and the second energy storage component are each configured for energy absorption during faults and energy storage during normal operation.

19. The modular T-type DC circuit breaker of claim 18, wherein when in the active current limiting mode, the modular T-type DC circuit breaker actively limits high currents by injecting a modulated sub-module voltage into the distribution line, and equivalently increasing the distribution line resistance by driving semiconductor devices of the arms in their saturation regions.

20. The modular T-type DC circuit breaker of claim 18, wherein the first sub-module, the second sub-module, and the vertical arm are configured as a half bridge T-breaker or as a full bridge T-breaker.

* * * * *